March 24, 1931.  A. F. SCHOEN  1,797,881
AUTOMOBILE HEADLIGHT
Filed Dec. 5, 1929
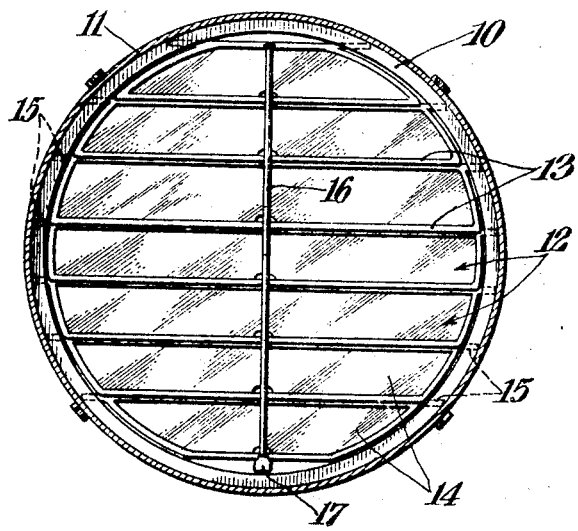
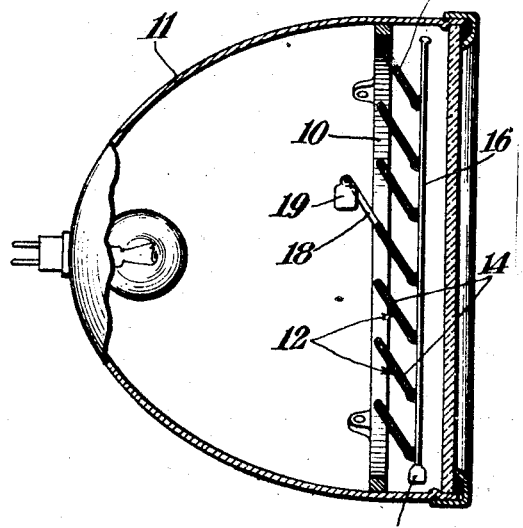
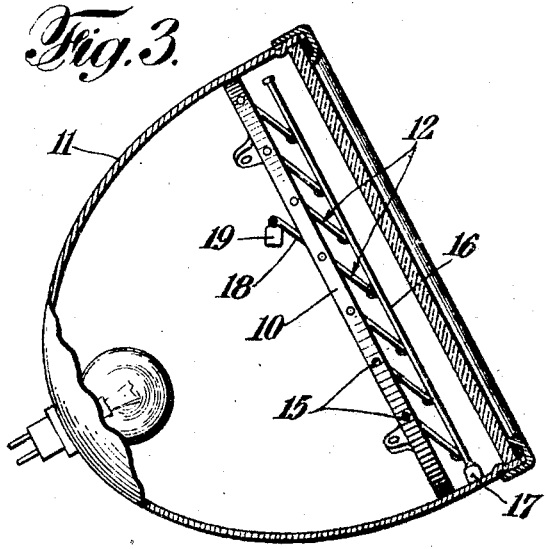
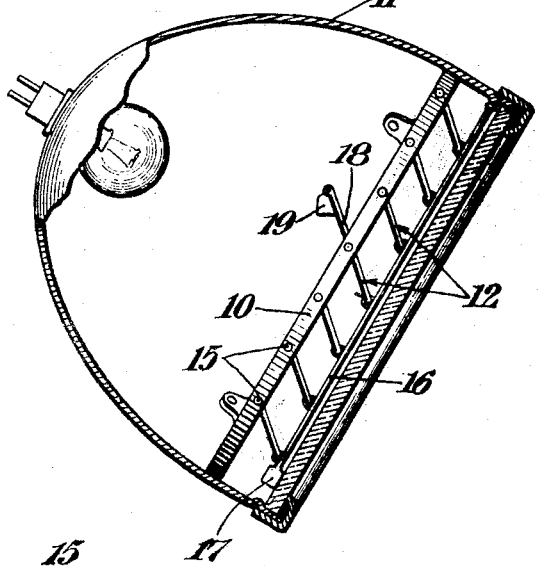
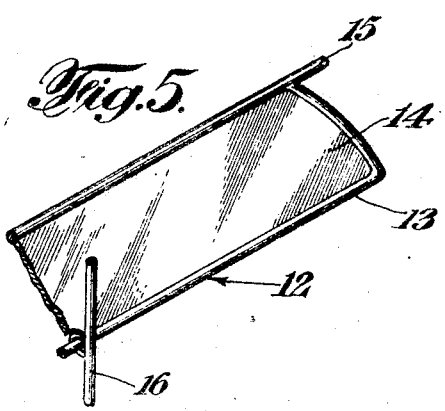
INVENTOR
Arnold F. Schoen
BY
Kenyon & Kenyon
ATTORNEYS Patented Mar. 24, 1931

1,797,881

UNITED STATES PATENT OFFICE

ARNOLD F. SCHOEN, OF SAUGERTIES, NEW YORK

AUTOMOBILE HEADLIGHT

Application filed December 5, 1929. Serial No. 411,745.

This invention relates to improvements in automobile headlights and has for an object a headlight glare shield composed of a plurality of pivotally supported shutters which are automatically turned relative to the headlight when the latter is tilted vertically.

Preferably the shutters are of colored transparent material and are so set that when the headlights are horizontal, as on a level road, the beams of light are prevented from causing glaring reflection in the eyes of an oncoming driver. When the headlights are tilted upwardly, as when going up hill, the shutters automatically are slightly closed and when the headlights are tilted downwardly, as when going down hill, the shutters are slightly opened. Whenever the headlights return to normal or horizontal position, the shutters likewise return to their normal position. This arrangement of shutters prevents glaring or blinding effect of the headlights under all conditions.

Other objects, novel features and advantages of this invention will be apparent from the following specification and accompanying drawings, wherein:

Fig. 1 is a front view of a shield embodying the invention.

Figs. 2, 3 and 4 are vertical sections through a headlight equipped with the shield, and Fig. 5 is a perspective partial view of a shutter.

The shield comprises a circular frame 10 which is adapted to fit within the reflector 11 of an automobile headlight and is spaced in the reflector directly in back of the lens. A plurality of shutters 12 are pivotally supported by the ring 10. Each shutter comprises a frame 13 of some light weight material within which is supported a transparent member 14. The transparent member may be colored glass, celluloid, or other similar material and preferably is colored so that it permits diffused light to show through the shutter at all times. Each shutter is provided with a pair of pintles 15 which extend into apertures in the frame 10 and constitute the pivots for the shutter. The front edges of the shutters are connected by a rod 16 at the lower end of which is provided a weight 17. The center shutter is provided with a rearwardly extending arm 18 to the end of which is attached a weight 19. The weights 17 and 19 act as a counter-balance to maintain the shutters in a definite position, irrespective of the position which the headlights may assume. The weights are so balanced that when the headlight is in horizontal position, the shutters 12 assume the position shown in Fig. 2. When the automobile to which the headlights are attached goes up-grade, the headlights will point upwardly and the shutters will assume the position shown in Fig. 3. When the car is going down-grade, the headlights will point downwardly and the shutters will assume the position shown in Fig. 4. The shutters automatically move into the different positions when the automobile negotiates a hill or encounters a bump or other irregularity in the roadway. In the different positions, the amount of light intercepted and colored upon passing through the shutters 12 is varied in accordance with the positions assumed by the shutters.

Also when going down grade, the shutters open to give additional illumination so that all conditions are taken care of automatically.

The arrangement is such that the shutters are arranged behind the lens so that no extra glass or mask is necessary for covering the shutters. The regular lens with which the headlight is equipped is sufficient.

It is of course understood that various modifications may be made in the structure above described without in any way departing from the spirit of the invention as defined in the appended claim.

I claim:

A glare shield for automobile headlights comprising a ring insertable in the casing of a headlight, shutters comprising a plurality of frames pivoted to said ring, transparent members mounted in said frames, a rod connecting the front edges of said shutters, a weight carried by said rod, a rearwardly extending arm carried by one of said shutters, and a weight supported by said arm.

In testimony whereof, I have signed my name to this specification.

ARNOLD F. SCHOEN.